United States Patent [19]

Simon

[11] Patent Number: 4,706,770
[45] Date of Patent: Nov. 17, 1987

[54] UTILITY HAULING VEHICLE HAVING FOUR WHEEL DRIVE

[75] Inventor: Merlin E. Simon, Cascade, Iowa

[73] Assignee: Deere & Company, Moline, Ill.

[21] Appl. No.: 854,213

[22] Filed: Apr. 21, 1986

[51] Int. Cl.$^4$ .................. B62D 61/10; B60K 17/342
[52] U.S. Cl. ........................... 180/24.02; 180/24.09;
 180/24.12; 180/251; 280/405 R
[58] Field of Search .................... 180/6.24, 6.26, 22,
 180/24.02, 24.09, 24.11, 24.12, 240, 241, 233,
 245, 246, 248, 249, 250, 251, 247; 74/701;
 280/405 R, 405 A, 405 B; 192/99 R, 66, 67 P,
 67 R

[56] References Cited

U.S. PATENT DOCUMENTS

| | | | |
|---|---|---|---|
| 834,008 | 10/1906 | Grier | 180/241 |
| 2,195,432 | 4/1940 | Short et al. | 180/24.12 |
| 2,595,494 | 5/1952 | Stratman | 180/251 X |
| 3,131,492 | 5/1964 | Speicher et al. | 280/405 R X |
| 3,191,708 | 6/1965 | Simonds et al. | 180/250 |
| 3,191,963 | 6/1965 | Prichard | 280/405 R X |
| 3,224,523 | 12/1965 | Ross | 180/24.11 X |
| 3,343,620 | 9/1967 | Karavias | 180/24.12 X |
| 3,370,665 | 2/1968 | Stanaback | 180/24.11 |

FOREIGN PATENT DOCUMENTS 359410 10/1922 Fed. Rep. of Germany ...... 180/251

Primary Examiner—John J. Love
Assistant Examiner—Charles R. Watts

[57] ABSTRACT

A utility hauling vehicle includes at least one steerable wheel suspended from the forward end of a rigid frame of the vehicle and front and rear pairs of unsuspended drive wheels mounted to the rigid frame rearwardly of the steerable wheel. The front pair of drive wheels is differentially driven and the rear pair of drive wheels is respectively coupled for being driven in unison with the front pair of drive wheels. A differential lock is provided for locking the rear pair of drive wheels and, hence, the front pair of drive wheels for rotation in unison. The suspension for the steerable front wheel or wheels acts to lift the forward end of the frame to transfer weight to the rear pair of drive wheels. Weight transfer can also be accomplished by mounting the front pair of drive wheels at a level above the rear pair of drive wheels. The vehicle has a load bearing zone substantially within a vertical projection of the largest area occupied by the drive wheels.

28 Claims, 7 Drawing Figures

| ADDED VEHICLE LOAD ① | | LOAD MEASURED AT WHEELS | | | | | |
|---|---|---|---|---|---|---|---|
| OPERATOR | PAYLOAD | WHEEL LOCATION | | | | | |
| O | P | F | LF | RF | LR | RR | |
| 0 | 0 | 204 | 58 | 78 | 198 | 190 | |
| 150 | 0 | 258 | 104 | 124 | 198 | 190 | WEIGHT IN POUNDS |
| | 100 | 260 | 122 | 140 | 228 | 222 | |
| | 200 | 262 | 138 | 158 | 262 | 256 | |
| | 300 | 264 | 156 | 178 | 292 | 288 | |
| | 400 | 266 | 172 | 198 | 324 | 322 | |
| | 500 | 266 | 190 | 218 | 354 | 352 | |
| | 600 | 268 | 206 | 236 | 386 | 386 | |
| | 700 | 268 | 222 | 256 | 418 | 420 | |
| | 800 | 270 | 238 | 276 | 450 | 452 | |

① EMPTY VEHICLE WEIGHT = 710 LBS.

UTILITY HAULING VEHICLE HAVING FOUR WHEEL DRIVE

BACKGROUND OF THE INVENTION

The present invention relates to a multiple wheeled hauling vehicle and more specifically relates to a four wheel drive vehicle capable of hauling modest size loads over a variety of terrain.

Three and four wheeled recreational vehicles designed for so-called all terrain use have become quite popular over the past ten to fifteen years. For the most part, these vehicles are designed just for carrying the rider, however some have been adapted for carrying additional loads by adding load carrying boxes and racks thereto. While these load carrying adaptations have increased the utility of these vehicles, the loads they are capable of bearing are quite small and the loading of some of the vehicles can adversely affect their handling and stability.

SUMMARY OF THE INVENTION

According to the present invention, there is provided an improved utility hauling vehicle.

A broad object of the invention is to provide a utility hauling vehicle having the capacity for hauling heavier loads than prior art three and four wheel utility vehicles of the same power class without sacrificing handling or stability characteristics.

Another object is to provide a utility hauling vehicle having four wheel drive, all terrain traversing capability and the ability to make relatively short turns without scrubbing or marring lawn grass and the like.

A more specific object is to provide a hauling vehicle having a rigid frame, at least one steerable front wheel suspended from the front of the frame, front and rear, unsuspended pairs of drive wheels mounted in tandem to said frame and each pair of drive wheels being differentially driven, all wheels being of the low pressure high flotation type, and the vehicle having a load carrying zone substantially confined to the vertical projection of the area containing said drive wheels.

Another object is to provide a utility hauling vehicle as set forth in the previous object designed such that weight is transferred to the rear pair of drive wheels so that during turning of the vehicle scrubbing by the front pair of drive wheels is minimized.

Still another object of the invention is to provide a utility hauling vehicle having front and rear pairs of differentially driven drive wheels as set forth hereinabove and to further provide a differential lock device which locks the rear pair of drive wheels for rotation in unison which results in the front pair of drive wheels also being locked for rotation in unison.

Yet another specific object is to provide a differential lock device which is in the form of a standard jaw clutch and controls for engaging and disengaging said clutch.

These and other objects will become apparent from a reading of the following description together with the appended drawings.

DESCRIPTION OF THE PREFERRED EMBODIMENT

Figure 1:
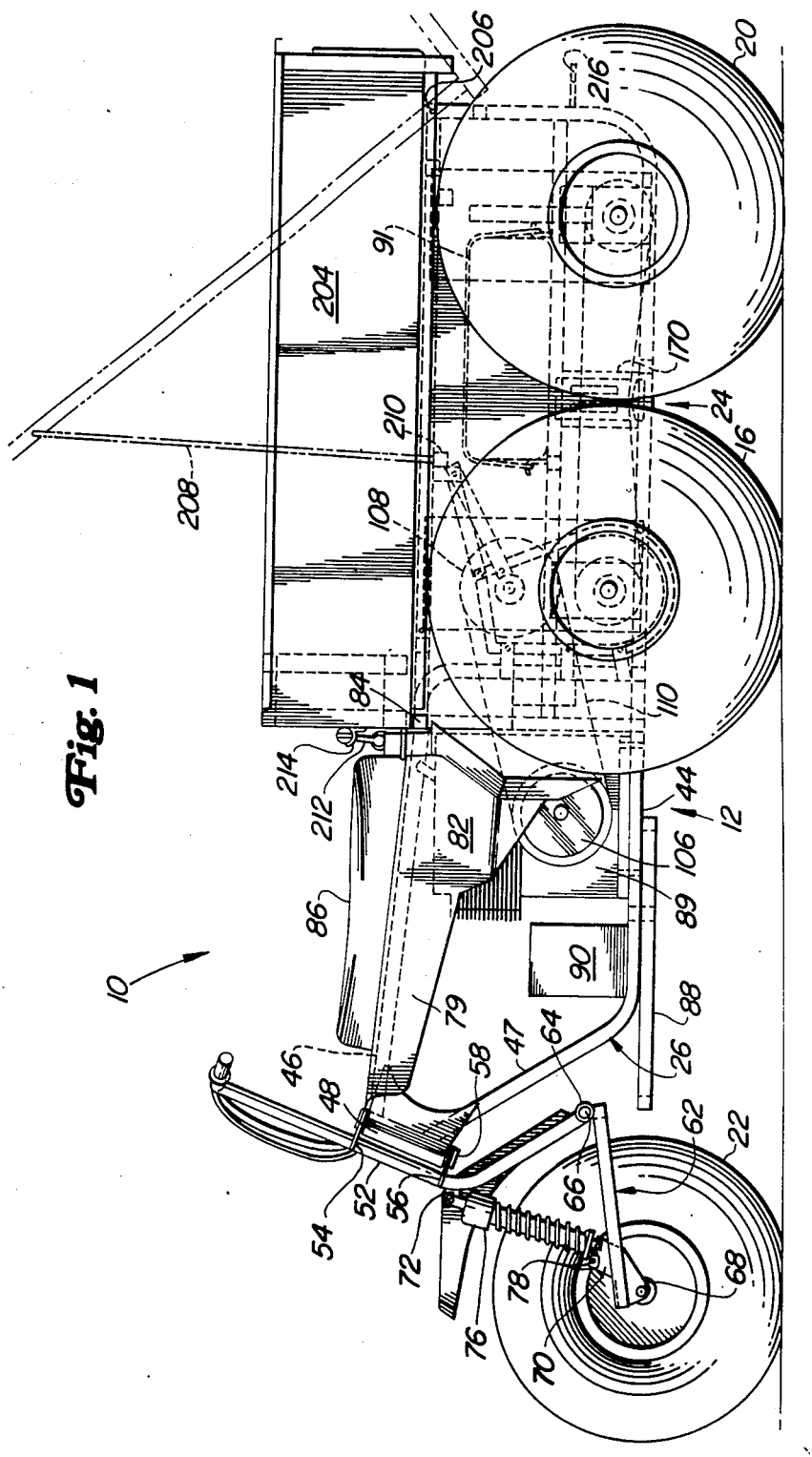
FIG. 1 is a left side elevational view of a utility hauling vehicle constructed in accordance with the present invention.
Figure 2:
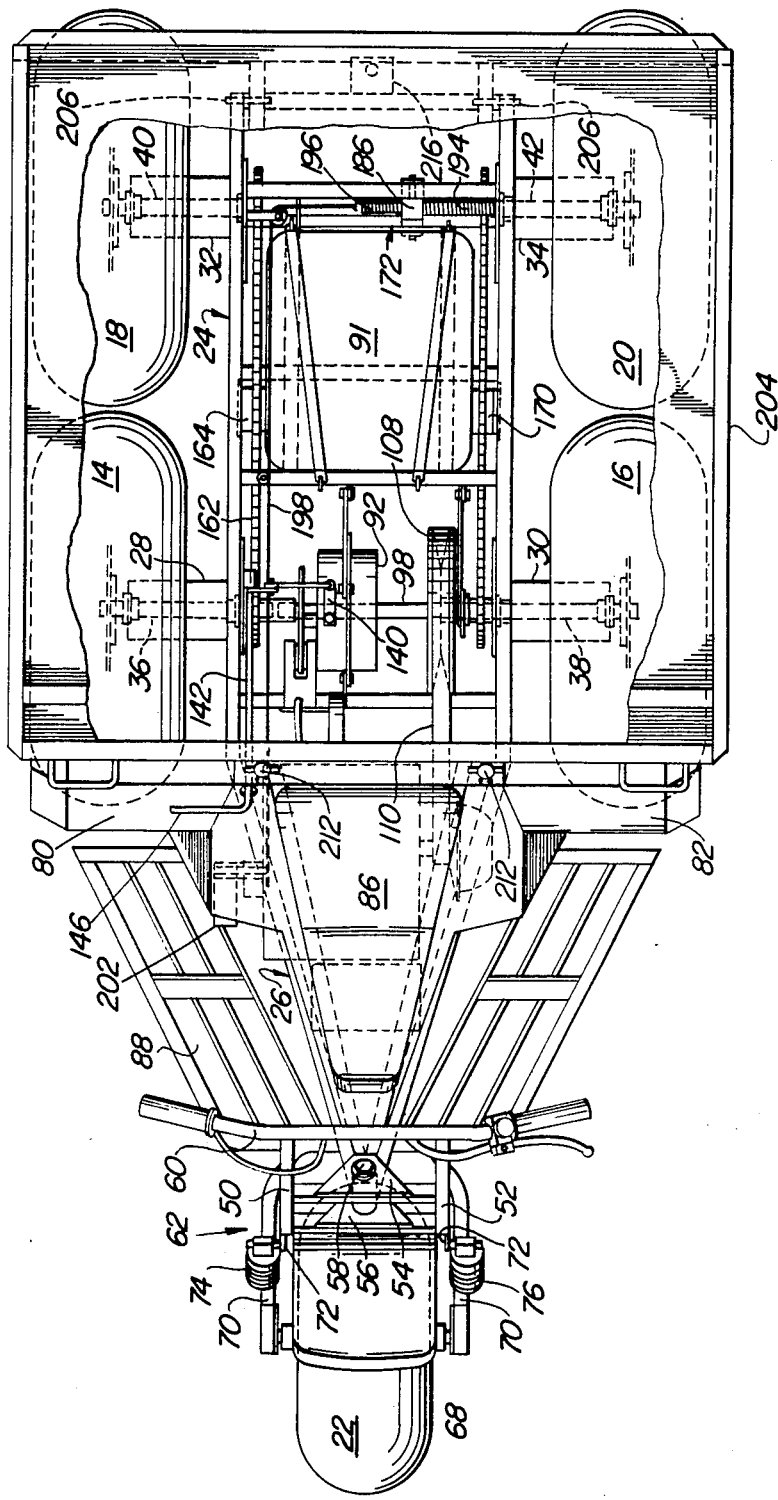
FIG. 2 is a top plan view, with portions broken away, of the vehicle shown in FIG. 1.
Figure 3:
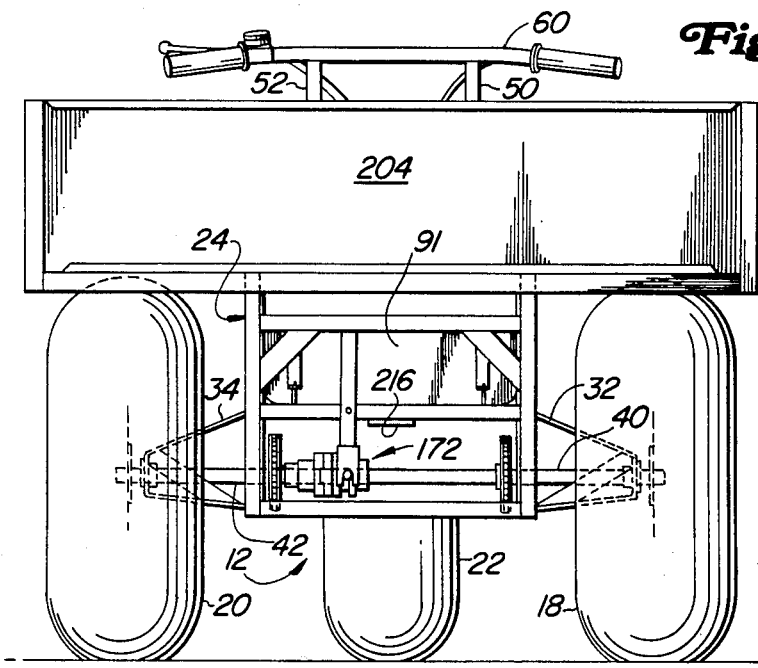
FIG. 3 is a rear view of the vehicle shown in FIG. 1.

Referring now to FIGS. 1-3, there is shown a utility hauling vehicle 10 including a rigid frame 12 supported by a front pair of unsuspended, right and left drive wheels 14 and 16, respectively, a rear pair of unsuspended, right and left drive wheels 18 and 20, respectively, and by a suspended, steerable front wheel 22. The pair of wheels 18 and 20 are mounted as close as is practical to the pair of wheels 14 and 16 in order to keep the turning radius of the vehicle at a minimum. Also, the wheels 14-22 are preferably of a low pressure (1-8 psi, for example) high flotation design for aiding in good stability and steering characteristics as explained in more details below.

The main frame 12 includes a plurality of tubular members welded together to form a box-like rear section 24 located between the front and rear pairs of drive wheels and a front section 26 which, in top view converges forwardly from the rear section. A front pair of right and left axle support structures 28 and 30, respectively, is fixed to and projects transversely from opposite lower side locations of the rear frame section 24 and spaced rearwardly of the structures 28 and 30 and similarly fixed to opposite lower side locations of the rear frame section is a rear pair of right and left axle support structures 32 and 34, respectively. The front drive wheels 14 and 16 are respectively fixed to the outer ends of front right and left drive axle sections 36 and 38, the latter being rotatably supported by bearings carried by the rear frame section and the front pair of axle support structures. Similarly, the rear drive wheels 18 and 20 are respectively fixed to the outer ends of rear right and left drive axle sections 40 and 42, the latter being rotatably supported by bearings carried by the rear frame section and the rear pair of axle support structures.

The front frame section 26 includes a lower structure which forms a horizontal engine support platform 44 and an upper structure which forms a slightly upwardly and forwardly inclined operator support platform 46. Continuing forwardly from the platform 44 is a steeply inclined structure 47 which together with the forward end of the platform 46 is joined to an upright cylindrical tube forming a steering spindle housing 48. A structure mounting the front wheel 22 for movement about the axis of the housing 48 for steering the vehicle 10 includes a pair of generally L-shaped tube members 50 and 52 joined in spaced, side-by-side relationship and having upper and lower flanges 54 and 56 secured thereto and disposed at the upper and lower ends of the housing 48. A steering spindle or pin 58 extends through the flanges and housing. A handle bar 60 is fixed to the tops of the members 50 and 52 and has the usual grips at its opposite ends. A U-shaped wheel mounting link 62 is vertically pivotally mounted to the lower ends of the members 50 and 52 by a structure including a transverse, cylindrical tube 64 welded to the bight portion of the link 62 and a pivot pin 66 extending through the members 50 and 52 and received in the tube 64. The front wheel 22 is located between the opposite legs of the link 62 and is rotatable about an axle structure 68 extending between and secured to forward ends of said link. A pair of brackets 70 is respectively fixed to the opposite legs of the link 62 and a pair of brackets 72 is located at the junctures of each leg portion forming the L-shaped members 50 and 52. A pair of shock absorbers 74 and 76 is respectively coupled between the pairs of brackets 70 and 72. The shock absorbers 74 and 76 are each pre-loaded in the downward direction so as to urge the link 62 and hence the wheel 22 downwardly against the ground and act to transfer the weight of the vehicle and any load borne thereby to the rear wheels 18 and 20 for a reason discussed in more detail below. Adjustment of down pressure is made possible by additional mounting holes 78 provided in the brackets 70. Alternate or additional adjustment may be accomplished by providing shock absorbers having springs that are adjustable as is well-known in the art.

Overlying and mounted to the operator support platform 46 is a molded plastic structure 79 including a rear portion defining right and left fenders 80 and 82 respectively located forwardly of the front drive wheels 14 and 16. The fenders 80 and 82 are each fastened to the back side of a horizontal transverse box support member 84 extending substantially the full width of the vehicle. An operator's seat 86 is located on top of the plastic structure 79 and is mounted to the support platform 46. A horizontal foot rest 88 is secured to the bottom of the engine support platform 44.

The vehicle 10 is powered by an internal combustion engine 89 mounted to the platform 44 just behind a battery 90. Fuel for the engine 89 is carried by a fuel tank 91 strapped down against horizontal cross members extending between opposite sides of the frame section 14.

Figure 4:
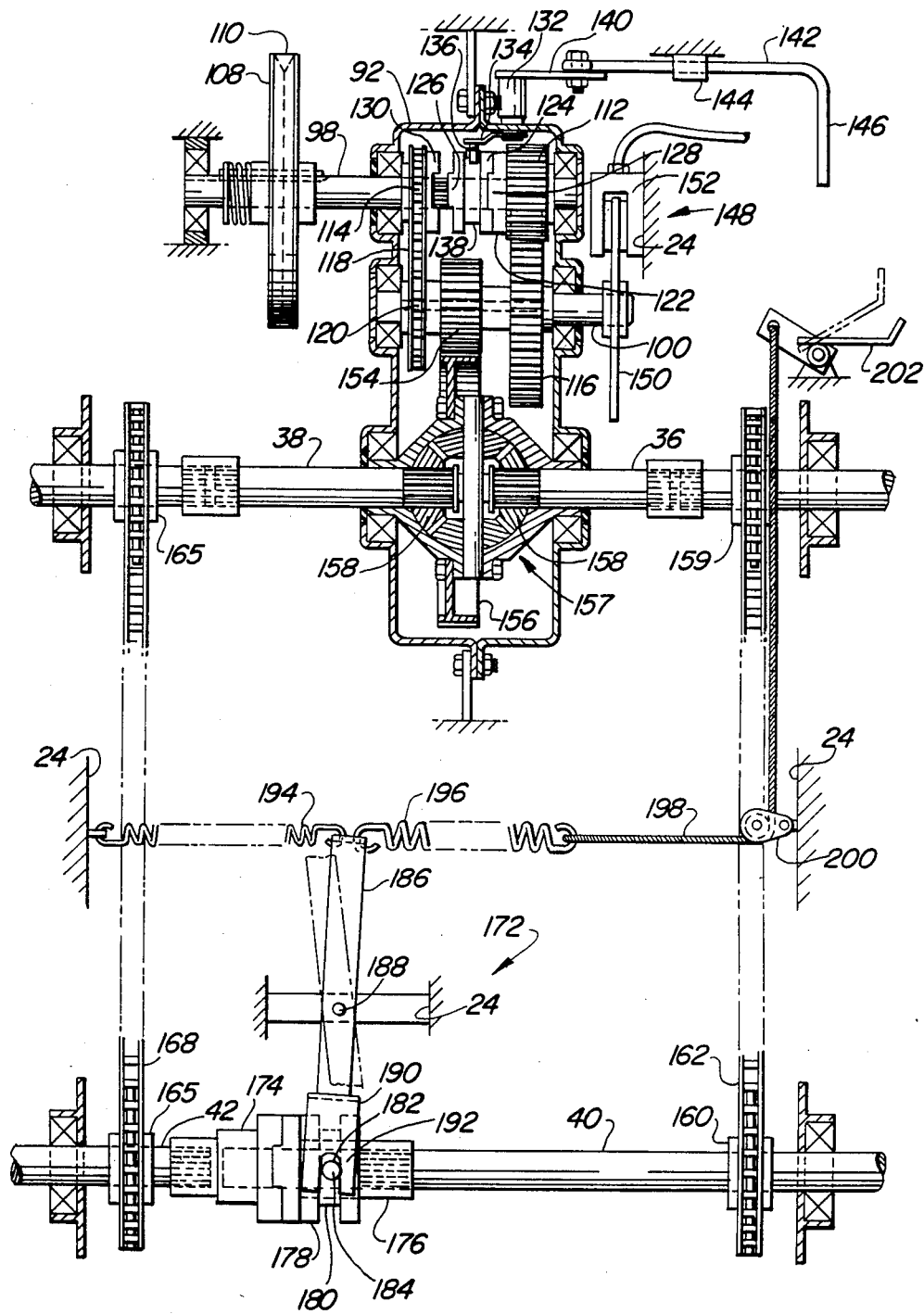
FIG. 4 is a somewhat schematic view of the rear portion of the vehicle drive train and controls therefor, and with the combined reverser and differential transmission being shown in vertical cross section.

The engine 89 has an output shaft (not shown) projecting from its left side. A gear case or housing 92 of a combined reverser and differential transmission is mounted to the rear frame section 24. Referring now also to FIG. 4, it can be seen that journalled in an upper location of the case 92 is an input shaft 98 below which is journalled an intermediate shaft 100. The front right and left drive axle sections 36 and 38, respectively, have inner end portions supported in a lower part of the case 92. Power is delivered to the input shaft 98 by a torque converter drive including a drive pulley 106 coupled to the engine output shaft, a driven pulley 108 coupled to a leftward projection of the input shaft 98 and a drive belt 110 trained about the pulleys 106 and 108. Rotatably mounted on the input shaft 98 respectively adjacent right and left walls of the case 92 are a forward drive pinion 112 and a rearward drive sprocket 114. The forward drive pinion 112 is meshed with a gear 116 fixed on the intermediate shaft 100 while the reverse drive sprocket 114 is coupled, as by a drive chain 118 to a sprocket 120 fixed on the shaft 100. Fixed for rotation with, but for axial movement along the input shaft 98 at a location between the pinion 112 and sprocket 114 is a forward-reverse shift collar 122. The right and left faces of the collar 122 are respectively provided with sets of drive lugs 124 and 126 for selective engagement with similar sets of drive lugs 128 and 130 respectively provided on the hubs of the pinion 112 and sprocket 114. The collar 122 is selectively shifted between forward and reverse drive establishing positions by a controller including a vertical shaft 132 rotatably mounted in the case 92 and to which is fixed an output arm 134 which carries a pin 136 located within an annular groove 138 provided in the collar 122. An input arm 140 is fixed to the top of the shaft 132 and is linked to a fore-and-aft extending control rod 142 that is pivotally mounted, as at 144 to the rear frame section 24 and terminates forwardly in an out-turned handle 146. A disc brake assembly 148 includes a disc 150 mounted on the right end of the intermediate shaft 100 and a hydraulically operated caliper 152 is mounted to the frame section 24 in straddling relationship to the disc 150 for selectively applying a braking force thereto.

An output pinion 154 is fixed for rotation with the intermediate shaft 100 and is meshed with an output gear 156 forming part of a differential 157 having a set of bevel gears 158 splined to respective inner ends of the front right and left drive axle sections 36 and 38. Thus, the front pair of drive wheels 14 and 16 may rotate relative to each other in the absence of the differential action being locked in a manner described below. The right front axle section 36 is coupled for driving the right rear axle section 40 by means of drive sprocket 159 fixed to the axle section 36, a driven sprocket 160 fixed to the axle section 40 and a drive chain 162 trained about the sprockets 159 and 160. A chain tensioner 164 (FIG. 2) is vertically adjustably mounted to the frame section 14 and engaged with a lower run of the chain 162. Similarly, the left front axle section 38 is coupled for driving the left rear axle section 42 by means of a drive sprocket 165 fixed to the axle section 38, a driven sprocket 166 fixed to the axle section 42 and a drive chain 168 trained about the sprockets 165 and 166. A chain tensioner 170 is provided for keeping the chain 168 properly tensioned.

A differential lock 172 in the form of a jaw clutch assembly is provided for locking the right and left rear axle sections 40 and 42 for rotation together, which, by virtue of the drive chains 162 and 168 results in the front axle sections 36 and 38 also rotating in unison. Specifically, the differential lock 172 includes an axially fixed clutch jaw 174 splined to an inner end of the left axle section 42 and a clutch jaw 176 splined for rotation with, but axial movement along an inner end portion of the right axle section 40. The jaw 176 includes a hub 178 provided with an annular groove 180 having a slip yoke band 182 received therein and provided with diametrically projecting pins 184 (only one shown). A control lever 186 is pivotally mounted, as at 188, to the rear frame section 24 and has a yoke 190 at its lower end, the yoke having notched legs 192 straddling the shiftable clutch jaw 176 and receiving the pins 184. A first tension spring 194 is coupled between an upper end of the lever 186 and the rear frame section 24 and normally biases the shiftable clutch jaw 176 rightwardly to an unlocked position wherein clutch jaws 174 and 176 are separated from each other. A second tension spring 196 has one end coupled to the upper end of the lever 186 in opposition to the spring 194 and another end coupled to an end of a control cable 198. The control cable 198 passes over a guide pulley 200 mounted to the right side of the rear frame section 24 and has another end coupled to a differential lock control pedal 202 pivotally mounted to the right side of the operator foot rest 88 (FIG. 2). The spring 196 is stiffer than spring 194 and when an operator presses down on the pedal 202, the lever 186 will be pivoted against the bias of the spring 194 and will act to effect engagement of the clutch jaws 174 and 176, as shown in FIG. 4. Should the clutch jaws 174 and 176 initially be misaligned, the cable 198 will act to stretch the spring 196 which then acts to bias the jaw 176 toward the jaw 174 so as to effect their inter-engagement once they do become properly aligned. The differential lock 172 thus remains engaged only so long as an operator depresses the pedal 202.

The vehicle 10, as viewed in plan view, includes a load carrying zone which is substantially confined to a zone circumscribed by the vertical projection of an area circumscribing the drive wheels 14—20. In other words, the zone has a width approximately equal to the distance between the outer faces of the right and left drive wheels and having a length approximately equal to the distance between the frontand rearmost portions respectively of the front and rear pairs of drive wheels. The confinement to this zone of loads hauled by the vehicle is important since it ensures that the handling or stability characteristics of the vehicle will not be negatively influenced as is the case with prior art vehicles having substantial loads located substantial distances rearwardly or outwardly of the support wheels. It is here noted, however, that apparatus mounted to the vehicle 10 within said zone may have parts extending substantially beyond the zone without adversely effecting the handling or stability characteristics of the vehicle if such parts have a weight which is insignificant when compared to the total weight of the apparatus. A sprayer having a fluid containing tank and pump located within the zone and having a boom extendible beyond the zone is an example of such an apparatus.

In the disclosed embodiment, an open top box 204 is provided for containing a load to be hauled. The box 204 normally rests on top of the rear frame section 24 and the transverse box support member 84 of the front frame section 26. A rear bottom portion of the box 204 is coupled, as at 206, to an upper rear portion of the rear frame section 14 for pivoting about a horizontal transverse axis to aid in dumping its contents. A prop rod 208 is pivotally mounted to a forward underside location of the box and is adapted to be pivoted to a vertical prop position, as shown in broken lines in FIG. 1, wherein the lower end thereof is received in a socket 210 provided on the rear frame section 24. A pair of elastic hold-down straps 212 is mounted to the rear of the support platform 46 adjacent the forward end of the box 204 and is releasably received in catches 214 provided at the forward side of the box 204. In addition to hauling a load contained in the box 204 or otherwise secured in the load hauling zone of the vehicle, the vehicle may pull a load through means of a hitch 216 fixed to a central rear location of the rear frame section 24.

Figure 7:
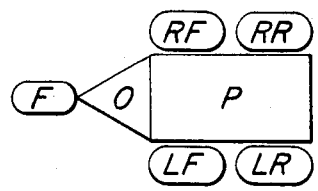
FIG. 7 is a table demonstrating the effect the weight transfer means has in placing more weight on the rear pair of drive wheels than on the front pair of drive wheels.

The weight transfer characteristic of the vehicle 10 shown in FIGS. 1-4 is made apparent by the table shown in FIG. 7 which contains the load measured at each of the wheels of such a vehicle for various loads carried by the vehicle. The vehicle used in the measurements had an empty weight of approximately seven hundred ten pounds and all measurements were made with the vehicle located on a level surface. As indicated by the vehicle diagram located above the table, the front steerable wheel is designated by F, the right and left front drive wheels are respectively designated by RF and LF, and the right and left rear drive wheels are respectively designated by RR and LR. The operator is designated by the letter O while the payload placed in the box is designated by the letter P.

The designed payload capacity of the vehicle used in the measurements was eight hundred pounds. The loads on the vehicle wheels were first measured without a payload and with no operator on board. Next loads were measured with the operator seated and then loads were measured as payloads in increments of one hundred pounds were added until the designed capacity was reached. Using the measured loads, it can be seen that the front set of drive wheels never support more than about thirty percent of the total weight carried by the vehicle while the rear set of drive wheels support up to about fifty three percent and the front steerable wheel supports the remaining weight. Thus, the table demonstrates the weight transfer characteristic of the vehicle which results in the front set of drive wheels supporting a significantly lesser amount of the weight of the vehicle, operator and payload than is carried by the rear set of drive wheels.

The operation of the embodiment of the vehicle 10 illustrated in FIGS. 1-4 is briefly as follows. Assuming normal, good tractive conditions, the vehicle 10 will be operated with the differential lock 172 disengaged so that relatively sharp turns can be made when desired. It has been observed that during such turns the low pressure, high flotation wheels deflect and roll sideways on the earth without skidding thus resulting in very little scrubbing or marring of the ground which is a very important characteristic when operating on lawn grass, for example. This characteristic is further enhanced by the fact that the frame 12 is rigid and the suspension for the front wheel 22 acts to lift up on the front of the frame 12 so as to transfer weight to the rear drive wheels 18 and 20. The vehicle 10 then turns somewhat like a three wheeled vehicle, and because they are not so heavily loaded, any skidding done by the front pair of drive wheels 14 and 16 will result in only minimal earth surface damage.

If the vehicle should encounter a relatively steep hill or muddy conditions, for example, additional traction can immediately be made available by locking out the differential action. An operator can easily accomplish this by pressing down on the pedal 202 with his foot to cause the cable 198 to pull on the lever 186 against the action of the spring 194 resulting in the clutch jaw 176 being moved into engagement with the clutch jaw 174 and thus in the axle sections 40 and 42 being fixed for rotating together. The chains 162 and 168 are then driven in unison to cause the axle sections 36 and 38 to be likewise driven in unison. As soon as the terrain characteristic requiring the additional traction is traversed, the operator releases his foot from the pedal 202 and the spring 194 acts to disengage the clutch jaws 176 and 178 from each other.

Because the load bearing zone of the vehicle 10 does not overhand the drive wheels 14-20 and the latter present a relatively large "footprint", the vehicle is exceptionally stable.

Figure 5:
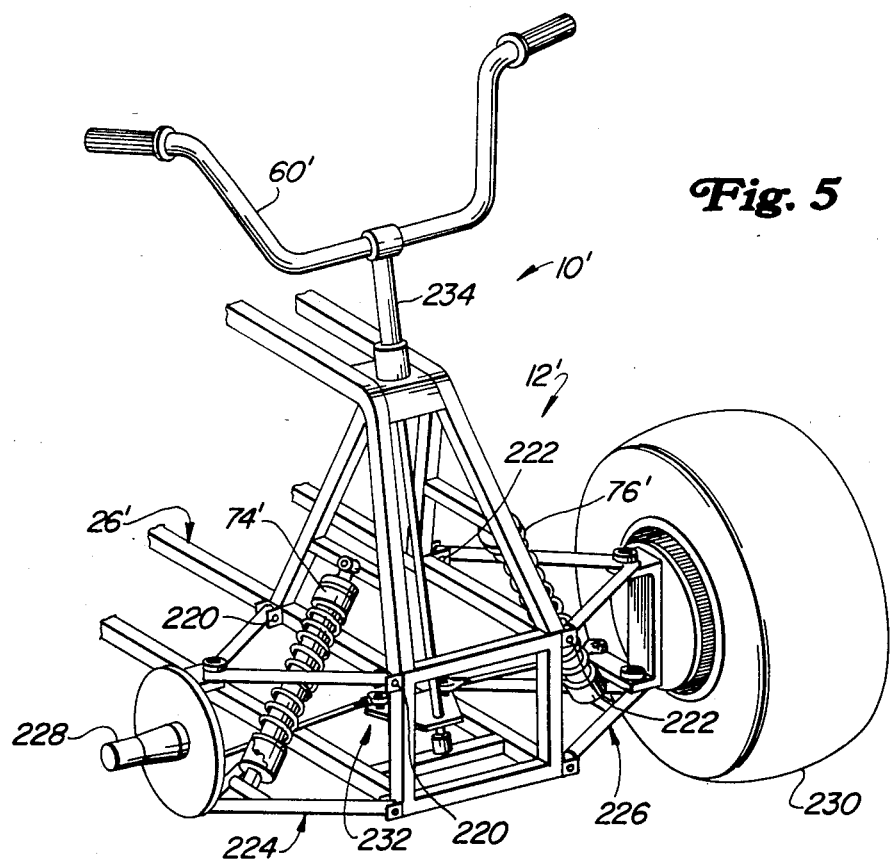
FIG. 5 shows a variation of the forward end of the vehicle shown in FIG. 1 wherein two steerable wheels are used instead of one.

Although the resulting steering radius would be larger than that of the vehicle 10 for some uses it may be necessary to use a modified version of the vehicle 10 which has two steerable front wheels. Thus, referring now to FIG. 5, there is shown the front end of a vehicle 10' which is just like the vehicle 10 shown in FIGS. 1-3 except that it employs a rigid frame 12' having a front frame section 26' designed for supporting a pair of steerable wheels instead of only one steerable wheel. Specifically, the front frame section 26' is not tapered forwardly, as is the frame section 26, and vertically pivotally mounted to right and left sides thereof, as at horizontal, longitudinal pivots 220 and 222, are right and left pairs of triangular shaped wheel support link assemblies 224 and 226, respectively. The link assemblies 224 and 226 respectively carry swively mounted, wheel support axles (only the right axle 228 being shown). Mounted to these axles is a pair of front wheels 230 (only the left wheel is shown). A steering linkage 232 is coupled between the lower end of a steering post 234 journalled in the frame section 26' and turnable through means of a handle bar 60'. A pair of shock absorbers 74' and 76' are coupled between the frame section 26' and the pair of wheel support link assemblies 224 and 226. Like the shock absorbers 74 and 76 in the first described embodiment, the shock absorbers 74' and 76' act to force the pair of front wheels 230 downwardly which results in the lifting of the forward end of the rigid frame 12' and hence in weight being transferred to the rear drive wheels of the vehicle.

Figure 6:
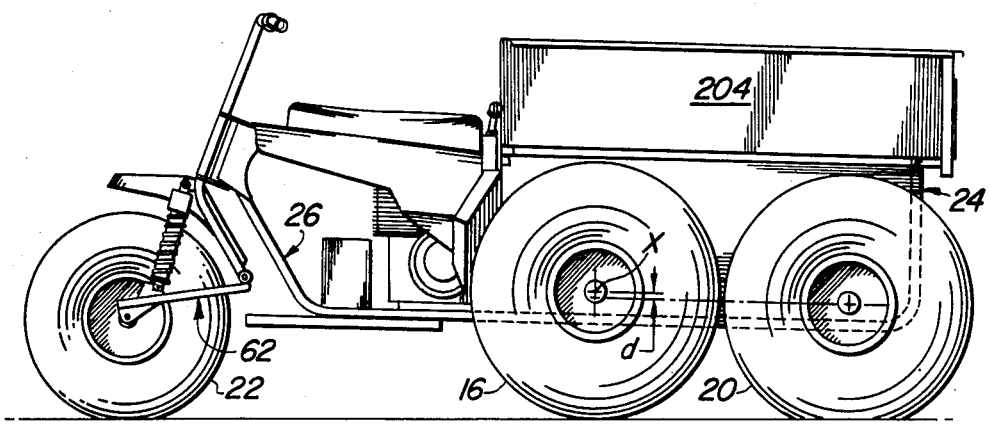
FIG. 6 shows a variation of the vehicle shown in FIG. 1 wherein the front, drive axle means is located at a level above the rear drive axle means for the purpose of having the rear drive wheels bear a greater proportion of the vehicle load than the front drive wheels.

Another method of transferring weight to the rear drive wheels alone or in conjunction with the front wheel suspension is illustrated in FIG. 6. Specifically, in FIG. 6, it can be seen that the front drive wheels are mounted to the rear frame section 24 for rotation about an axis X which is located a distance d above the level of the rear drive wheels. Thus, it will be understood that the first increment of weight of any load placed on the vehicle will first be borne by the front wheel and rear pair of drive wheels.

I claim:

1. A four wheel drive vehicle comprising: a support frame; a prime mover mounted on the frame; first and second drive axle means rotatably mounted to the frame; said first drive axle means being divided into separate first and second axle sections and said second drive axle means being divided into separate third and fourth axle sections; four ground wheels respectively being mounted to said first, second, third and fourth axle sections; a drive train means coupled to the prime mover and including differential means coupled to the first and second axle sections for permitting differential rotation therebetween; said drive train means further including a first drive means coupled between the first and third axle sections for causing them to be driven in unison and a second drive means coupled between the second and fourth axle sections for causing them to be driven in unison; and a differential lock means coupled between the third and fourth axle sections and including a moveable connector means for selectively establishing a normally unlocked condition wherein the third and fourth axle sections may rotate differentially and a locked condition wherein the third and fourth axle sections and hence the first and second axle sections are caused to rotate in unison.

2. The four wheel drive vehicle defined in claim 1 wherein said differential lock means is a jaw clutch having a first jaw axially and rotatably fixed to said third axle section and having a second jaw axially shiftably mounted on and rotatably fixed to said fourth axle section and defining a portion of said moveable connector means.

3. The four wheel drive vehicle defined in claim 1 or 2 wherein said first drive means includes first and second fore-and-aft aligned sprockets respectively fixed to said first and third axle sections and a first drive chain trained about the first and second sprockets and wherein said second drive means includes third and fourth fore-and-aft aligned sprockets respectively fixed to said second and fourth axle sections and a second drive chain trained about the third and fourth sprockets.

4. The four wheel drive vehicle defined in claim 2 wherein said second jaw element is provided with an annular recess; said shiftable connector means further including a slip yoke band received in said recess; a shifting arm engaged with said yoke and pivotally mounted to the frame; a first spring coupled between the arm and the frame and biasing the second jaw away from the first jaw; a second spring which is substantially stiffer than the first spring being coupled to the lever; and a control cable means connected to the second spring for selectively pulling the second spring in opposition to the first spring and for effecting pivotal movement of the arm for, in turn, exerting a force on the second jaw for moving it into engagement with the first jaw.

5. A wheeled vehicle, comprising: a rigid frame; a first transverse drive axle means supported by the frame and including separate first and second axle sections; a second transverse drive axle means spaced rearwardly from the first axle means and including separate third and fourth axle sections; first, second, third and fourth wheels respectively being coupled to said first, second, third and fourth axle sections; a prime mover mounted on the frame; a drive train means coupled between said prime mover and said first and second drive axle means and including differential means and selectively engageable differential lock means coupled in different ones of said first and second drive axle means; said differential means normally permitting relative rotation between the first and second axle sections, and between the third and fourth axle sections; said differential lock means being operable for causing the axle sections of one of the first and second drive axle means to be driven in unison; and a steerable front wheel means mounted to the frame.

6. The wheeled vehicle defined in claim 5 wherein drive train means includes a first sprocket-and-chain drive coupled between the first and third axle sections and a second sprocket-and-chain drive coupled between the second and fourth axle sections.

7. The wheeled vehicle defined in claim 6 wherein said differential means is coupled in the first transverse drive axle means.

8. The wheeled vehicle defined in claim 5 and further including weight transfer means for causing a proportionally greater amount of weight to be carried by the wheels coupled to the second axle means than is carried by the wheels coupled to the first axle means.

9. The vehicle defined in claim 8 wherein said steerable front wheel means is suspended for vertical movement relative to said frame; and said weight transfer means including biasing means urging said steerable front wheel means downwardly so as to result in the forward end of the rigid frame being lifted thereby causing the wheels mounted on the second drive axle means to carry more weight than the wheels mounted on the first drive axle means.

10. The vehicle defined in claim 8 wherein said weight transfer means includes said first axle means being mounted at a higher level on said frame than said second axle means whereby the wheels mounted on said second axle means will carry more weight than the wheels mounted on the first axle means.

11. The wheeled vehicle defined in claim 5 wherein at least the wheels mounted to the first and second axle sections are low pressure high flotation wheels.

12. The wheeled vehicle defined in claim 5 wherein at least said four wheels are low pressure high flotation wheels.

13. The wheeled vehicle defined in claim 12 wherein said front steerable wheel means includes only one front wheel; and said front wheel being a low pressure high flotation wheel.

14. The wheeled vehicle defined in claim 12 wherein said front steerable wheel means includes two front wheels; and said two front wheels being low pressure high flotation wheels.

15. The vehicle defined in claim 5 wherein the vehicle has a load bearing zone substantially confined to a zone circumscribed by a vertical projection of the area circumscribing the wheels coupled to the four axle sections.

16. The vehicle defined in claim 5 wherein the vehicle includes a box for containing a load to be hauled by the vehicle; and said box when viewed from the top being dimensioned so as to be located substantially within a zone circumscribed by a vertical projection of the area circumscribing the wheels coupled to the four axle sections.

17. The vehicle defined in claim 5 wherein said differential lock means includes a jaw clutch having a first clutch jaw axially and rotatably fixed to one of the drive axle sections of said one of the first and second drive axle means, a second clutch jaw rotatably fixed to but axially shiftable along another of the drive axle sections of said one of the first and second drive axle means and control means coupled to and normally holding the second clutch jaw disengaged from the first clutch jaw but being selecting operable for effecting engagement of the first and second clutch jaws.

18. The vehicle defined in claim 17 wherein said control means includes a lever having one end coupled to the second clutch jaw; said lever being pivotally mounted to the frame such that said one end describes an arcuate path toward and away from said first clutch jaw; a first spring coupled between the frame and lever and acting to bias the one end of the lever away from the first clutch jaw whereby the second clutch jaw is normally held disengaged from the first clutch jaw; a cable coupled to the lever for pulling on it in opposition to the first spring so as to move said one end toward the first clutch jaw to thereby effect engagement of the first and second clutch jaws; and a foot pedal connected to the cable for selectively pulling on the latter so as to transmit a pulling force on the lever.

19. The vehicle defined in claim 18 wherein the cable is coupled to the lever by a second spring which is stiffer than the first spring and which stretches only in the event that the clutch jaws are not aligned for engagement when the foot pedal is depressed and the stretched spring acting to effect engagement of the clutch jaws as soon as they become aligned.

20. The vehicle defined in claim 5 wherein the differential lock means is coupled between the third and fourth drive axle sections.

21. A utility hauling vehicle, comprising: a rigid frame; a prime mover mounted on the frame; a steerable front wheel means being mounted on a forward portion of said frame; a front drive axle means including separate first and second axle sections rotatably mounted in the frame in a middle portion between front and rear ends of the frame; a rear drive axle means including separate third and fourth axle sections rotatably mounted in a rear portion of the frame; four drive wheels respectively mounted on the first, second, third and fourth axle sections and cooperating with the front wheel means for carrying the entire weight of the vehicle; weight transfer means for causing a proportionally greater amount of weight to be carried by the wheels coupled to the rear drive axle means than is carried by the wheels coupled to the front drive axle means; and drive train means coupled between the prime mover and said front and rear drive axle means and including differential means permitting relative rotation between the first and second axle sections and between the third and fourth axle sections whereby steering of the vehicle is enhanced by cooperation of the weight transfer means and differential means and the weight transfer means acts to lessen marring of a ground surface tranversed during steering operation.

22. The utility hauling vehicle defined in claim 21 wherein said steerable front wheel means is suspended for vertical movement relative to said frame; and said weight transfer means including yieldable biasing means urging said steerable front wheel means downwardly so as to result in the forward end of the rigid frame being lifted thereby causing the wheels mounted on the rear drive axle means to carry more weight than the wheels mounted on the front drive axle means.

23. The utility hauling vehicle defined in claim 22 wherein said steerable front wheel means includes a wheel mounting structure means connected to the frame, and a link means mounted for up and down movement relative to said frame; said steerable front wheel means including a single wheel rotatably mounted to said link means; and said mounting structure including said yieldable biasing means coupling to said link means for urging the latter downwardly.

24. The utility hauling vehicle defined in claim 21 wherein said weight transfer means includes said front drive axle means being mounted on said frame at a level above said rear drive axle means.

25. The utility hauling vehicle defined in claim 21 wherein the front steerable wheel means defines a forwardmost portion of the vehicle, the wheels mounted to the rear drive axle means define a rearmost portion of the vehicle and have peripheries located close to peripheries of the wheels mounted to the front drive axle means; and a sea. mounted to the frame and having a front end proximate the forward end of the frame and a rearward end approximately even, as viewed from the side, with forward peripheral portions of the wheels mounted on the front drive axle means.

26. The utility hauling vehicle defined in claim 25 wherein the vehicle has a load bearing zone substantially confined to a zone circumscribed by a vertical projection of the area circumscribing the wheels coupled to the front and rear drive axle means.

27. The utility hauling vehicle defined in claim 26 wherein the vehicle includes a box for containing a load to be hauled by the vehicle; and said box being located entirely within said load bearing zone.

28. The utility hauling vehicle defined in claim 21 wherein the wheels mounted to said front and rear drive axle means are low pressure, high flotation wheels which cushion ground forces imposed on the wheels during operation and deflect and roll during steering operations so as to contribute in lessening marring of the ground surface travered during such operations.

* * * * *